United States Patent
Stadlmann

(10) Patent No.: US 10,414,091 B2
(45) Date of Patent: Sep. 17, 2019

(54) SYSTEM FOR LAYERED CONSTRUCTION OF A BODY AND TRAY THEREFOR

(71) Applicant: Way To Production GmbH, Vienna (AT)

(72) Inventor: Klaus Stadlmann, Traiskirchen (AT)

( * ) Notice: Subject to any disclaimer, the term of this patent is extended or adjusted under 35 U.S.C. 154(b) by 432 days.

(21) Appl. No.: 14/898,651

(22) PCT Filed: Jun. 11, 2014

(86) PCT No.: PCT/AT2014/050131
§ 371 (c)(1),
(2) Date: Dec. 15, 2015

(87) PCT Pub. No.: WO2014/201486
PCT Pub. Date: Dec. 24, 2014

(65) Prior Publication Data
US 2016/0136902 A1    May 19, 2016

(30) Foreign Application Priority Data
Jun. 17, 2013   (AT) .................................. 50391/2013

(51) Int. Cl.
*B29C 64/135*   (2017.01)
*B29C 64/245*   (2017.01)
(Continued)

(52) U.S. Cl.
CPC .......... *B29C 64/135* (2017.08); *B29C 64/129* (2017.08); *B29C 64/20* (2017.08);
(Continued)

(58) Field of Classification Search
None
See application file for complete search history.

(56) References Cited

U.S. PATENT DOCUMENTS

| | | | |
|---|---|---|---|
| 5,158,858 A | * | 10/1992 | Lawton ................. B29C 64/135 |
| | | | 264/40.1 |
| 2010/0227068 A1 | * | 9/2010 | Boot .................... B29C 67/0066 |
| | | | 427/346 |

(Continued)

FOREIGN PATENT DOCUMENTS

| DE | 20106887 A1 | 10/2001 |
|---|---|---|
| DE | 10119817 A1 | 10/2002 |

(Continued)

OTHER PUBLICATIONS

International Preliminary Report on Patentability received for PCT Patent Application No. PCT/AT2014/050131, dated Dec. 17, 2015, 7 pages.

(Continued)

*Primary Examiner* — Seyed Masoud Malekzadeh
*Assistant Examiner* — Manley L Cummins, IV

(57) ABSTRACT

A system is described for layered construction of a body made of a light-curable substance. The system comprises a tray made of resilient material for receiving the substance in a liquid or pasty state, a light source for regionally selective curing of the layer of the substance lying on the tray base, a construction platform arranged above the tray base and capable of being lowered and raised relative thereto for adhering to and lifting the cured substance layer, a tensioning means configured to exert tension or compression onto the tray, and a control means controlling the tensioning means and the construction platform accordingly. A tray is also described for use in a system of this type.

8 Claims, 11 Drawing Sheets

(51) Int. Cl.
  *B29C 64/129*  (2017.01)
  *B29C 64/20*   (2017.01)
  *B29C 64/40*   (2017.01)
  *B33Y 30/00*       (2015.01)
  *B29C 64/386*      (2017.01)

(52) U.S. Cl.
  CPC ............ *B29C 64/245* (2017.08); *B29C 64/40* (2017.08); *B29C 64/386* (2017.08); *B33Y 30/00* (2014.12)

(56) References Cited

U.S. PATENT DOCUMENTS

| | | | |
|---|---|---|---|
| 2013/0001834 A1 | 1/2013 | Ei-Siblani et al. | |
| 2013/0270746 A1* | 10/2013 | Elsey | B29C 35/0805 264/447 |
| 2014/0191442 A1* | 7/2014 | Elsey | B29C 67/0062 264/401 |

FOREIGN PATENT DOCUMENTS

| | | |
|---|---|---|
| DE | 102012011610 A1 | 11/2012 |
| EP | 1253002 A1 | 10/2002 |
| EP | 2067609 A1 | 6/2009 |
| JP | 04-255327 A | 9/1992 |
| JP | 04-341826 A | 11/1992 |
| JP | H 04341826 * | 11/1992 |
| JP | 6-81727 U | 11/1994 |
| JP | 2002-103460 A | 4/2002 |
| WO | 01/40866 A2 | 6/2001 |
| WO | 2012/021940 A1 | 2/2012 |
| WO | 2013/026087 A1 | 2/2013 |

OTHER PUBLICATIONS

Examination Report received for Austrian Patent Application No. A 50391/2013, dated Apr. 24, 2014, 4 pages (Official copy only).
International Search Report and Written Opinion received for PCT Patent Application No. PCT/AT2014/050131, dated Oct. 1, 2014, 10 pages (Official copy only).

* cited by examiner

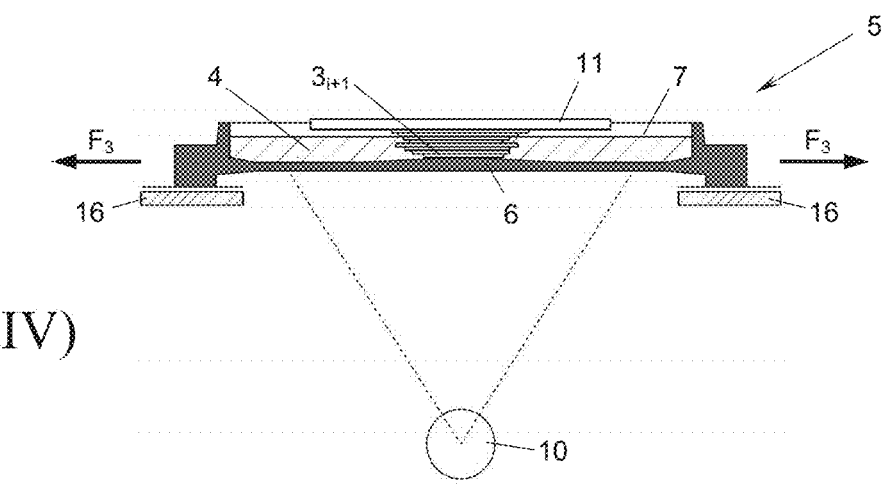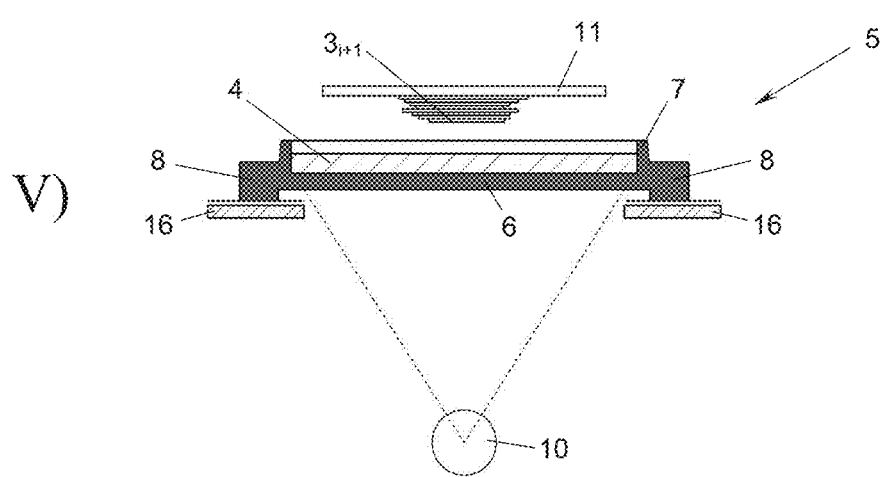
Fig. 5

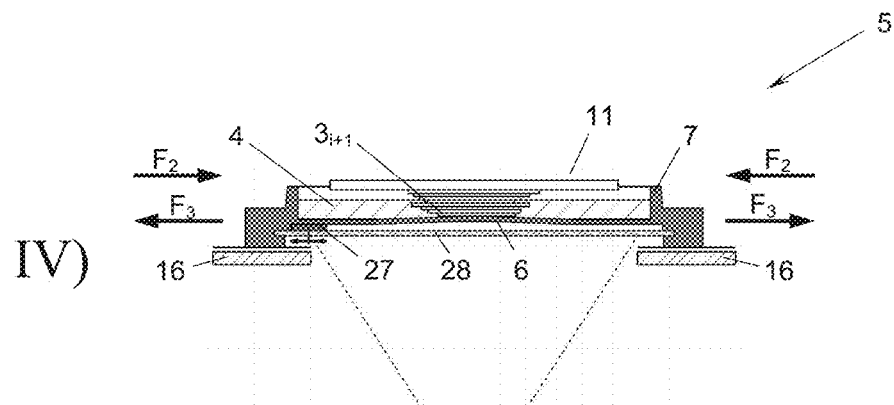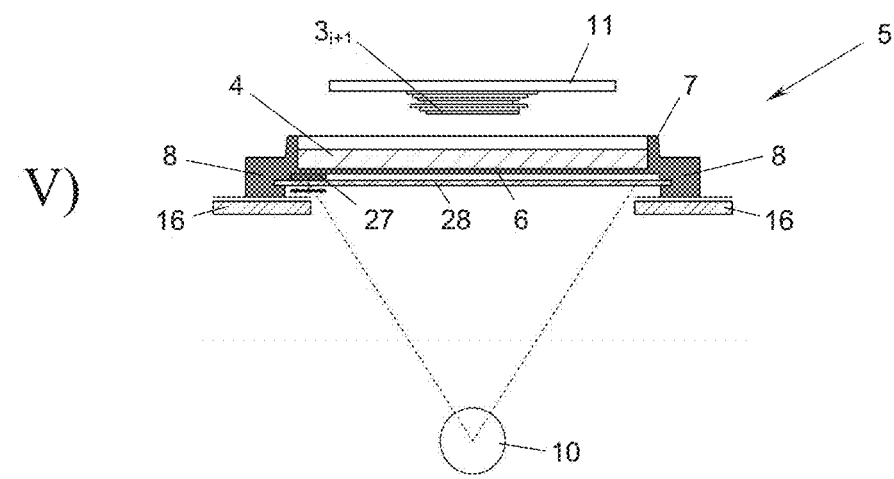
Fig. 7b

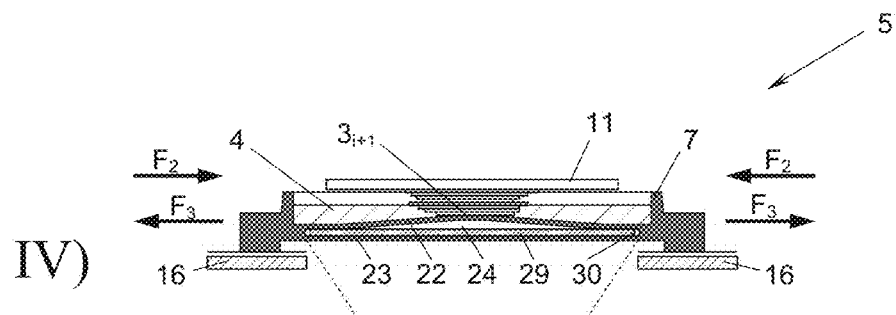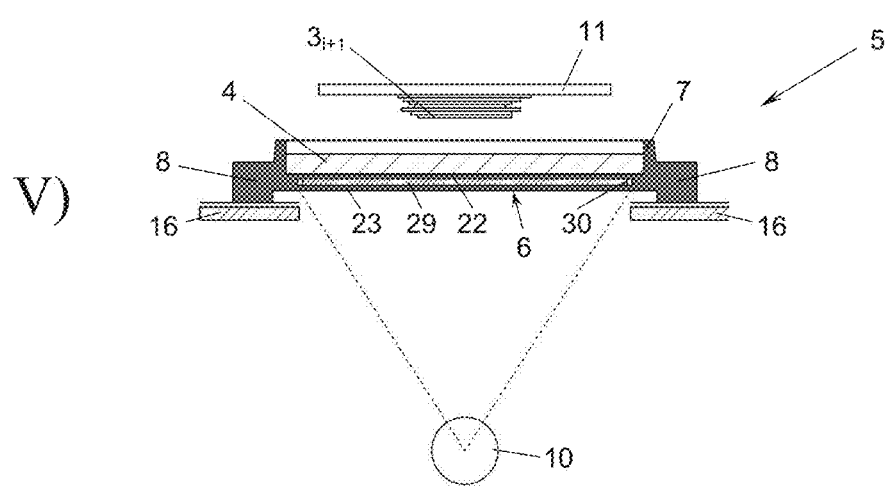
Fig. 8b

SYSTEM FOR LAYERED CONSTRUCTION OF A BODY AND TRAY THEREFOR

CROSS-REFERENCE TO RELATED APPLICATION(S)

This application is a U.S. national phase of International Application No. PCT/AT2014/050131, filed Jun. 11, 2014, which designated the U.S. and claims priority to Austrian Patent Application No. A 50391/2013, filed Jun. 17, 2013, the disclosures of which are herein incorporated by reference in their entireties.

BACKGROUND

Technical Field

The present application relates to a system for layered construction of a body made of a light-curable substance, comprising a tray made of resilient material for receiving the substance in a liquid or pasty state, a light source for regionally selective curing of the layer of the substance lying on the tray base, and a construction platform arranged above the tray base and capable of being lowered and raised relative thereto for adhering to and lifting the cured substance layer. The present application also relates to a tray for use in a system of this type.

Background Art

A system of the type described in the introduction is known from US 2013/0001834 A1.

The construction of three-dimensional bodies from light-curable substances, such as liquid photo-sensitive synthetic resins or photopolymers, which are irradiated layer by layer by masked or focussed light, is known under a wide range of names, such as rapid prototyping, photo solidification, 3D printing or stereo(litho)graphy. In modern generative production machines, pixel-controllable DLP, MEMS or micromirror chips or controllable lasers are used for the exposure to light of the individual layers and can expose a substance layer resting on a light-permeable baseplate in a single step in order to cure the layer in selected pixel regions. The cured layer adheres to a construction platform held above the baseplate and is then raised with this in order to allow new liquid substance to flow in onto the baseplate, said substance then being cured in a next exposure step, and so on. The body is thus constructed successively from individual layers, whereas the construction platform is raised upwardly successively.

A big problem here is the destruction-free detachment or demoulding of the cured layers from the baseplate so as to allow the next liquid layer to flow in. In the literature, numerous solutions have already been proposed in order to facilitate the demoulding of the cured layer. One of these solutions lies in arranging a transparent, flexible separation film loosely above the baseplate, which film stretches as the platform is raised and then peels off from the last-cured layer, starting from the edge, until it springs back into its original position above the baseplate on account of its resilience (DE 101 19 817 A1, JP H06 246 838 A). Other solutions use a forcibly controlled, pivotable and tippable baseplate having an intermediate resilient separation film (WO 2013/026087 A1, WO 01/05575 A1) or a resilient tray (see US 2013/0001834 A1 mentioned in the introduction), which is tipped downwardly to detach the layers cured in the tray. All of these known solutions have the disadvantage of high pull-off forces of the cured layers from the baseplate, separation film or tray and therefore a reduced robustness of the construction process. Filigree structures thus can be provided only with difficulty. Additional supporting structures are thus usually necessary in the body to be constructed and have to be removed again in a complex manner during final processing and increase the material consumption unnecessarily.

BRIEF SUMMARY

The object of the present application is to create systems and devices of the type mentioned in the introduction that are simpler and less susceptible to faults than the known solutions and at the same time enable a destruction-free demoulding of the cured layer.

This objective is achieved in a first aspect with a system of the type mentioned in the introduction, which is characterised by a tensioning means, which is configured to exert tension or compression onto the tray, and by a control means controlling the tensioning means and the construction platform accordingly.

Instead of a rigid base having a resilient separation film for the demoulding process, the system according to an embodiment uses a completely new approach, more specifically a tray that is manufactured from resilient material and thus can be deformed as a whole. The entire tray can thus deform with its tray base as the construction platform and the cured substance layer adhered thereto are raised, which assists and facilitates the peeling off of the substance layer from the tray base. Once the cured substance layer has peeled off completely, the tray passes automatically back into its starting position on account of its resilience. This eradicates the need for a complicated drive of the baseplate and also a separate resilient separation film prone to high wear. Due to the low pull-off forces of the solution according to an embodiment, improved surface qualities, higher detail resolutions, and thinner wall thicknesses of the produced bodies can be achieved; even regions in a component that have not completely cured still separate from the tray. This can be utilised in particular for articulated regions in the component, in which case the strength of the joint region is controlled by exposure parameters; a "strength" gradient can thus be provided in the component.

Due to the tensioning means according to an embodiment, the demoulding process or the peeling off of the cured layer from the tray base, during which the resilient tray deforms due to the peel-off force, can be actively supported and facilitated by additional deformation forces exerted onto the resilient tray. The resilient tray here enables different operating modes: On the one hand the tensioning means can pull apart the tray diametrically, whereby the tray base is tensioned and at the same time thinned, which exerts both lateral and downwardly directed additional peel-off forces onto the cured layer. On the other hand, the tray can also be compressed diametrically, whereby the tray base curves, more specifically downwardly, which generates additional demoulding forces, or curves upwardly, which provides a convex shape of the tray base compared with the cured layer and promotes a peeling off starting from the edges of the layer. The exertion of tension and/or compression by the tensioning means can also be provided in a pulsating manner, such that the tray for example is made to vibrate.

An embodiment of the present application is characterised in that the tray is produced in one piece from the resilient material, in one embodiment from silicone. The tray can thus be produced as an economical mass part, in particular as a disposable product that can be exchanged in a modular manner, as will be explained later in greater detail. The inner side of the tray, in particular the tray base, here does not even need a separate sealing or protective layer with respect to the light-curable substance, since it is intended only for the construction of one or a few bodies, such that a potential parasitic diffusion of the substance into the surface of the tray base is negligible for this short service life.

In a further embodiment the tensioning means is designed to exert substantially diametrical tension or compression onto the tray.

The tensioning means can be formed in any ways known in the art that are able to exert a diametrical tension or compression, for example as scissor or tong design, spindle drive or in the form of eccentric cams, which press onto the tray or pull thereon laterally, etc.

The tensioning means may have two clamping jaws movable relative to one another, which are detachably connectable to lateral tabs of the tray, such that the tray can be quickly exchanged in a modular manner. The clamping jaws can be moved for example by means of separate spindle drives, or just one clamping jaw is driven and the other clamping jaw is fixed.

In a first variant the tabs have vertical apertures, which can be threaded onto threading pins of the clamping jaws. On the one hand a good retention of the tray in the clamping direction is achieved, and on the other hand the tensile or compressive force of a clamping jaw can be distributed among a plurality of positions distributed over the width of the tray in order to avoid the formation of folds in the tray base. For the same purpose each tab may alternatively have a horizontal aperture, through which a retaining axle of a clamping jaw can be guided.

It is also possible to embed reinforcement rings, retaining eyelets, clips, or the like in the tabs for the engagement of the tensioning means, for example when injection moulding the tray. These may generally be coupling elements, which can be coupled to complementary coupling elements of the clamping jaws, for example hooks, which can be introduced into eyelets, and vice versa.

In accordance with a further optional feature the system may also comprise a flattening element, which is mounted in the system movably in a plane below the tray base on the underside thereof in order to flatten the tray base. Such a flattening element is useful in particular in any phase of the construction process in which the construction platform is lowered again following the demoulding of the last-cured layer so as to approach the tray base up to the layer thickness of the next layer to be cured. In this phase, the tray base, with a highly viscous, i.e. pasty substance, which only slowly evades the lowering construction platform with the cured layer stack, could bulge downwardly resiliently. The bulge can be remedied or flattened by the flattening element— optionally controlled by the control means—so as to produce a planar liquid substance layer between the tray base and the construction platform or last-cured substance layer in the layer thickness correct for the next exposure process.

The flattening element may be, for example, a straight edge or a doctor blade, which is swept over the underside of the tray base. The flattening element can be a roller, which is rolled over the underside of the tray base in order to reduce the friction and take care of the base.

In a further variant the tray base can also be formed as a double base. This promotes a symmetrical introduction of force into the tray during pulling and pushing and also makes it possible to mount, between the two bases of the double base, a flattening element movable over the underside of the upper base in order to flatten this.

The double base may additionally also support between its two bases a rigid plate which, in the event of resilient deformation of the tray and therefore of the two bases, can slide relative thereto. This provides a sandwich construction formed from resilient base-rigid plate-resilient base. The rigid plat may be enclosed for example on all sides by the resilient material of the tray. Such a loosely sliding embedding can be achieved for example by an anti-adhesion coating of the plate.

In a second aspect a tray for exchangeable insertion is created, in a modular manner, in a system of the type presented here, which tray is manufactured from a resilient material, wherein the tray is configured for the engagement of a tensioning means in order to exert tension or compression onto the tray. The tray can be equipped with lateral tabs for the engagement of the tensioning means. The tray can be easily anchored temporarily in the system at these tabs. At least the base of the tab can be at least partially light-permeable.

The tray can be filled with light-curable substance and sealed on its upper side by a removable cover sheet. The tray thus forms a disposable ready-to-use product, which can be inserted into the system in the manner of a printer cartridge so as to construct one or more bodies until the store of light-curable substance contained in the tray is used.

The tray can be produced in one piece from the resilient material, e.g., from silicone, which is well suited for economical mass production as a disposable part.

BRIEF DESCRIPTION OF THE DRAWINGS/FIGURES

The present application will be explained in greater detail hereinafter on the basis of exemplary embodiments illustrated in the accompanying drawings, in which:

FIGS. 5 to 8 show the operating principles of further embodiments of the system of FIG. 1 in a representation similar to FIG. 4.

DETAILED DESCRIPTION

Figure 1:
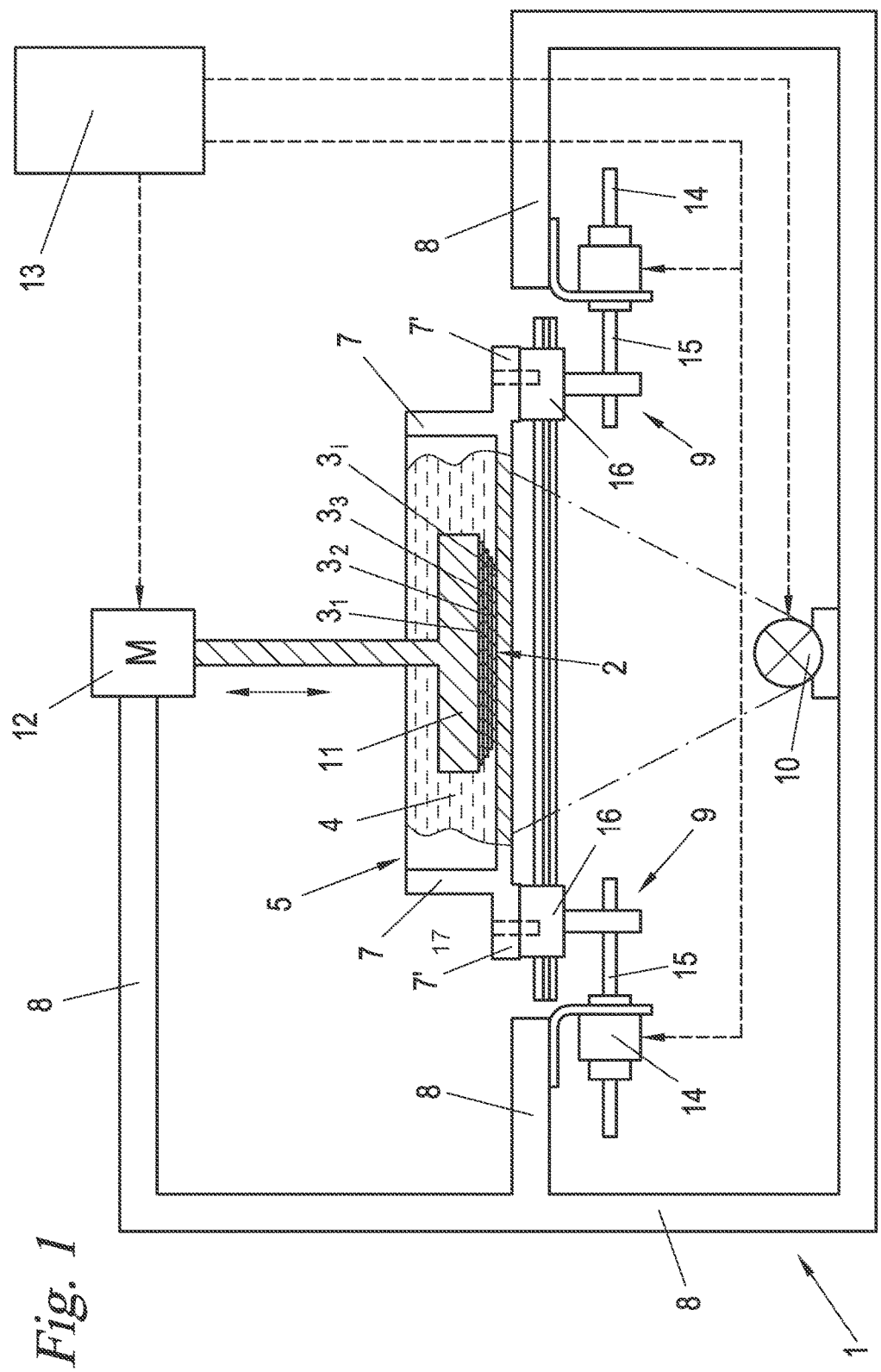
FIG. 1 shows the system in a schematic side view.

FIG. 1 shows a system 1 for "rapid prototyping" for the construction of a three-dimensional body 2 from individual layers $3_1, 3_2, \ldots$, generally $3_i$, which are each cured—layer by layer—from a liquid substance 4 in a tray 5.

The liquid substance 4 is curable by means of light radiation ("light-curable"), for example by UV light. The term "light" is understood here generally to mean any type of electromagnetic radiation that can exert a chemical effect of this type on the substance 4, for example also infrared light, etc. The term "liquid" is also understood here to mean pasty consistencies of any viscosity.

Figure 2:
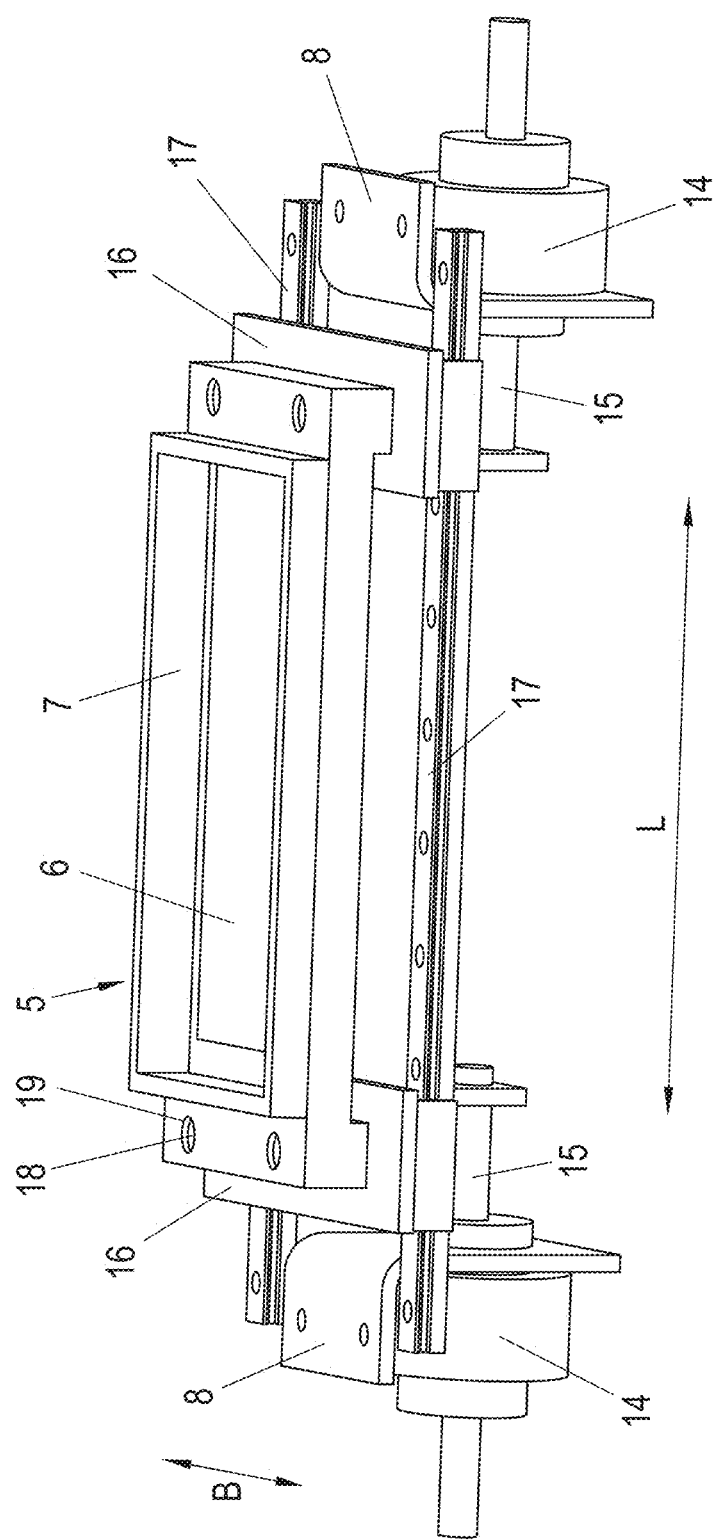
FIG. 2 shows the tray and tensioning means of the system of FIG. 1 in an enlarged perspective view.

For this purpose, the tray 5 is produced from a material permeable for this light radiation, more specifically at least in that region of its tray base 6 (as shown in FIG. 2) above which the body 2 is to be constructed. The entire tray base 6 can be light-permeable, and optionally also its peripheral tray edge 7 protruding vertically from the tray base 6, in particular when the tray 5 is produced in one piece.

The tray 5 is mounted at least at two diametrically opposed, lateral ends on a supporting structure 8, optionally via a tensioning means 9. In simplified embodiments the tensioning means 9 can be omitted. The tray 5 is produced from a resilient material, for example transparent, resilient plastic, rubber or silicone, and, with the aid of the optional tensioning means 9, diametrical tensile or compressive forces for example can additionally be exerted onto the tray 5, as will be explained later in greater detail.

Below the tray 5 there lies a controllable light source 10 for exposing to light the lowermost substance layer $3_i$ to be cured. Above the tray 5 or the tray base 6, there is located a construction platform 11, which can be raised and lowered relative to the tray base 6 by means of a drive 12 mounted on the supporting structure 8. The construction platform 11 has a substantially planar underside (although this is not necessarily the case), which at the start of the body construction is immersed in the liquid substance 4 and is brought to a short distance from the upper side of the tray base 6. The distance corresponds substantially to the layer thickness of the layer $3_i$ to be cured and for example is a few 100 μm. By lowering the construction platform 11, the substance 4 is displaced and fills out this distance or gap as a thin film having this layer thickness.

The light source 10 is then activated and selectively exposes to light those regions of the substance layer $3_i$ to be cured that are to be solidified. The light source 10 may be of any type, for example a planar light source having prefixed masks or exposure films individually for each layer $3_i$; a dot-shaped movable light source such as a deflectable "writing" light beam in the form of a laser scanner or MEMS scanner for laser or light-emitting diodes; or a planar light source that can be controlled pixel by pixel, for example a DLP, MEMS or micromirror chip, as are used for example in video beamers and which can project an image onto the substance layer $3_i$ with a resolution of, for example, 1920× 1080 pixels in a single exposure step so as to cure the layer regionally selectively in accordance with the form of the body 2 desired in this layer. In the case of laser-based light sources, a laser spot in the coordinate space (X/Y plane) for example can be moved very accurately in a vector-based manner, for example by moving the entire laser unit or by deflecting the laser beam by optical elements.

In theory, the light source 10 could also be located above the tray base 6, in which case it is not absolutely necessary for the tray base 6 to be at least partially light-permeable.

Following the successful curing of a layer $3_i$, here the first layer $3_1$, the construction platform 11 is raised, wherein the cured layer $3_i$ adheres to the construction platform 11—or each further layer $3_i$ adheres to the previous layer $3_{i-1}$—and should detach from the tray base 6 where possible without destruction. The design measures in order to enable detachment or demoulding of the cured layer $3_i$ from the tray base 6 where possible without destruction will be described later in greater detail.

In practice, the construction platform 11 is raised by more than the layer thickness of the next substance layer to be cured $3_{i+1}$, for example a multiple of the layer thickness, so that liquid substance 4, which usually has a high viscosity, can flow where possible in an unhindered manner into the gap between raised construction platform 11 with adhered substance layer stack $3_1$-$3_i$ on the one hand and tray base 6 on the other hand. The construction platform 11 is then lowered again with the adhered substance layer stack $3_1$-$3_i$ until the lowermost cured substance layer $3_i$ is at the correct distance from the tray base 6, wherein the re-lowering displaces the substance 4 in order to generate a gap-free liquid film for the next exposure process. The system 1 thus operates cyclically in strokes of the construction platform 11, wherein each cycle includes the steps of lowering, exposure to light, and lifting (demoulding). Here, the system 1 is controlled by an electronics unit 13, which actuates the drive 12 of the construction platform 11, the light source 10 and the optional tensioning means 9 accordingly.

FIG. 2 shows a possible embodiment of the tensioning means 9 in detail. The tensioning means 9 comprises two spindle drives 14 mounted on the supporting structure 8, which each drive a clamping jaw 16 via a threaded spindle 15. The clamping jaws 16 are guided on a linear guide 17 so as to be movable linearly relative to one another. Only one clamping jaw 16 could optionally be movable, and the other could be fixed, and a spindle drive 14 could therefore be omitted, however a symmetrical movement of the two clamping jaws 16 is advantageous in order to take the greatest care possible of the cured layer $3_i$ during demoulding. It goes without saying that the clamping jaws 16 could also be moved relative to one another differently than by spindle drives, for example by eccentric or scissor drives, etc.

Each clamping jaw 16 has at least one, optionally a plurality of threading pins 18 distributed over the width B of the tray 5, it being possible for a lateral tab 7' of the tray 5 to be threaded (slid or run) onto each of said pins by means of vertical apertures 19. The tray 5 can thus be easily fitted onto the tensioning means 10 from above.

It goes without saying that the tray 5 with its tabs 7' can also be mounted differently in the tensioning means 9, for example with the aid of retaining clips or complementary hooks or detent lugs of the clamping jaws 16 and/or tabs 7'. Coupling elements 17 could thus be embedded (at least in part) in the tabs 7', for example with injection moulding of the tray 5, and can be detachably coupled to complementary coupling elements, which are formed or mounted on the clamping jaws 16. By way of example, these coupling elements 17 embedded in the tabs 7' may be reinforcement rings, retaining eyelets, clips, hooks, etc., which can be connected to complementary elements, such as pins, hooks, clips, etc. of the clamping jaws 16.

When the tensioning means 9 is to exert merely compression onto the tray 5, it could compress the tray 5 simply diametrically, wherein the tabs 7' could also be omitted. It is also possible for the tray 5 to be grasped by the tensioning means 9 on more than two opposite sides, for example also in the direction of its width B. The tray 5 could thus be compressed or stretched from all 4 sides in the plane of the tray base 6, even differently, i.e. could be compressed in its width direction B and stretched in its longitudinal direction L, or vice versa.

Figure 3A:
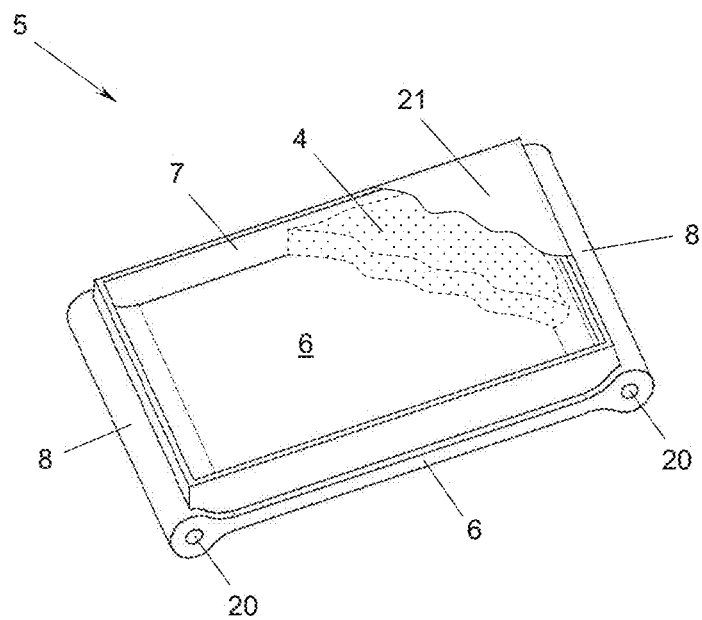
FIGS. 3a and 3b show further embodiments of a tray that can be used in the system of FIG. 1, in each case in a perspective view.
Figure 3B:
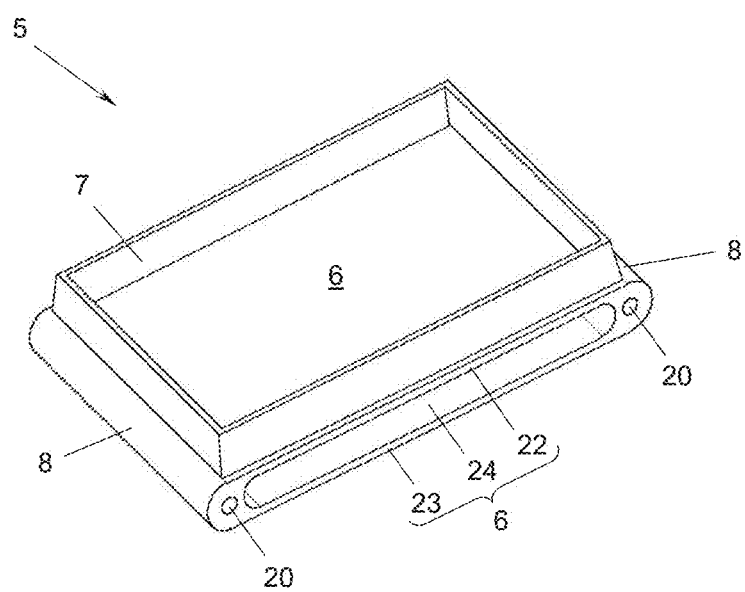

FIGS. 3a and 3b show two alternative embodiments of the resilient tray 5, wherein, instead of vertical apertures 19 in each tab 7', a horizontal aperture 20 is provided, through which a horizontal retaining axle of a clamping jaw 16 can be run therethrough. The retaining axle for example may be a wire bow (not shown), which is delivered together with the tray 5 and is hooked onto corresponding hooks (not shown) of a clamping jaw 16.

As shown in FIG. 3a the tray 5 may be pre-filled with a quantity of liquid, light-curable substance 4 and may be sealed on its upper side, i.e. the upper side of its edge 7, with a removable cover sheet 21, for example an aluminium foil with grip tab. The tray 5 with substance 4 and foil cover 21 can thus be pre-produced and delivered for example as a disposable part, which can be used exchangeably in a modular manner in the system 1.

FIG. 3b shows an embodiment of the tray 5 with a double base 6 comprising an upper base 22 and a lower base 23, between which a flat gap 24 remains. This embodiment on the one hand attains an improved symmetry of the tensile and compressive forces with respect to the tabs 7', and on the other hand the gap 24 can be used for further elements, as will be explained later in greater detail with reference to FIGS. 7 and 8.

In each of FIGS. 4 to 8 the operating principle of the resilient tray 5 is shown in different embodiments of the system 1 and in different phases of a construction cycle for a layer 3; more specifically as follows:

phase I) starting position,
phase II) lowering of the construction platform,
phase III) exposure to light,
phase IV) raising of the construction platform and the demoulding of the cured layer, and
phase V) final position=starting position.

Figure 4A:
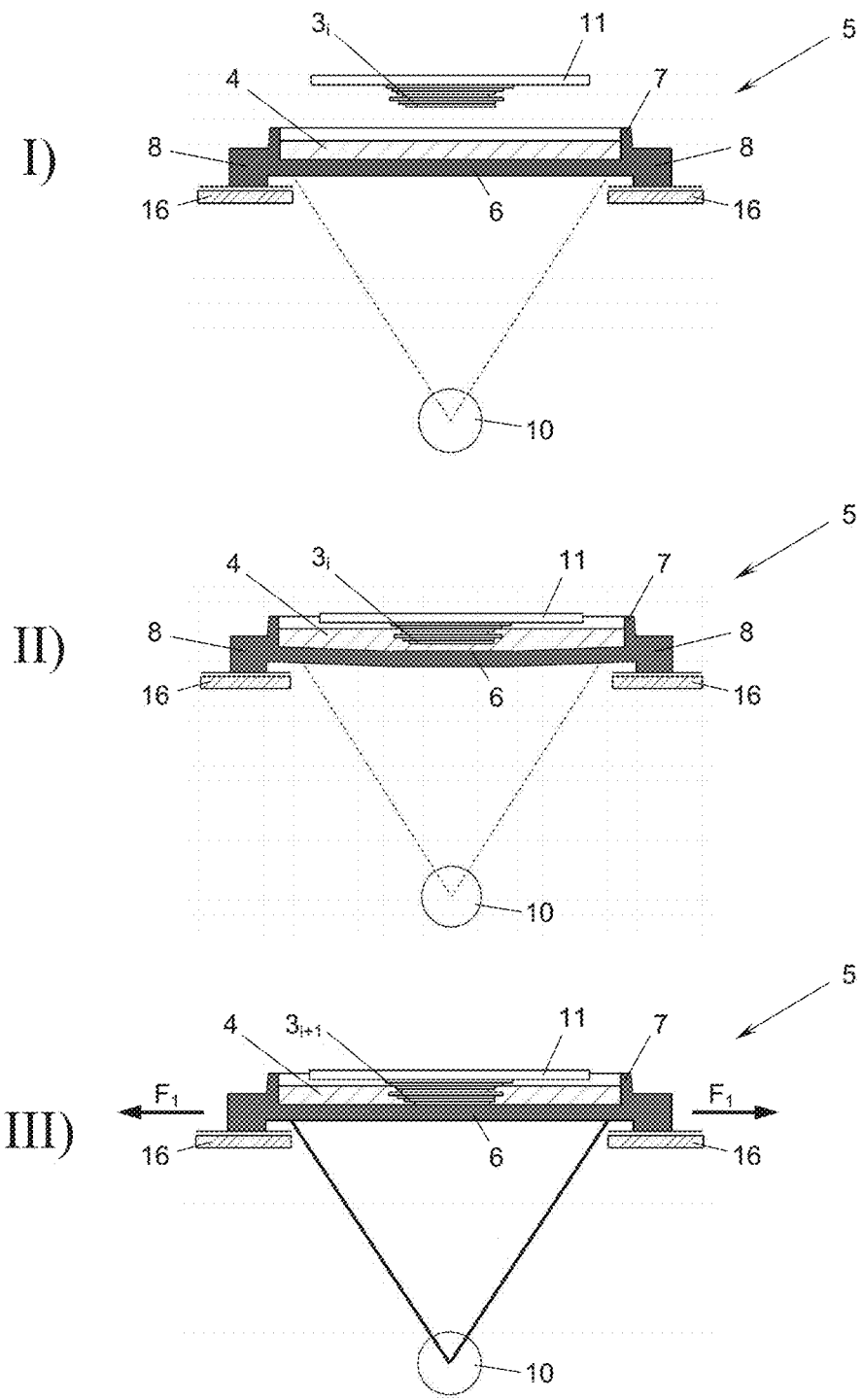
FIG. 4 shows the operating principle of an embodiment of the system of FIG. 1 on the basis of schematic and detailed sectional views in various stages I) to V) of the production of a body.
Figure 4B:
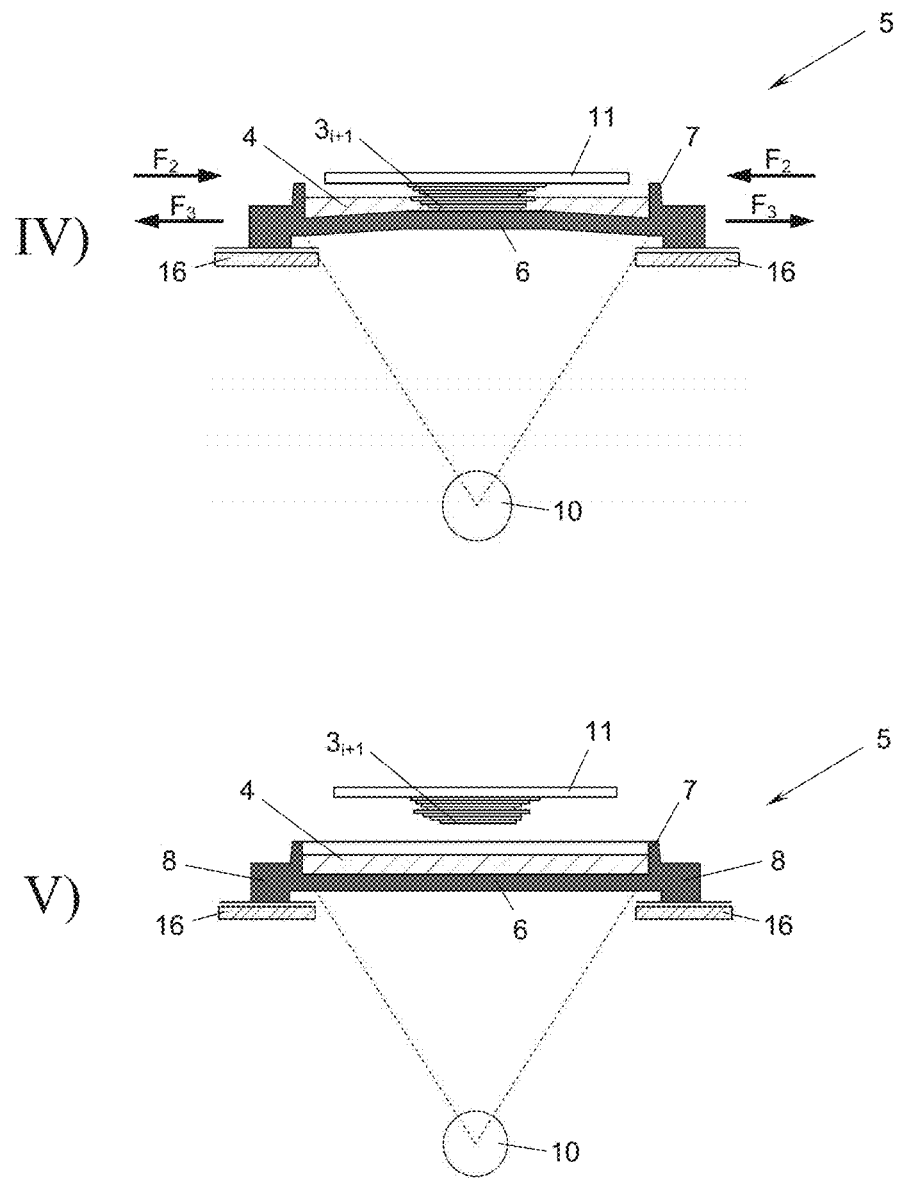

FIGS. 4a and 4b show a first embodiment of the system 1, in which the tensioning means 9 is used for the optional exertion of diametrical compression or tension onto the tray 5.

Proceeding from the starting position (phase I), on account of the viscosity of the substance 4, the tray base 6 may temporarily bulge slightly downwardly as the construction platform 11 with the substance layer stack $3_1$-$3_i$ is immersed into the liquid substance 4 (phase II). The tray base 6 then either returns automatically on account of the resilience of the material of the tray 5 for the exposure process in phase III, or this is assisted by additional diametrical tensile forces $F_1$ exerted by the tensioning means 9 onto the tray 5. Where necessary, tensile forces $F_1$ may be applied already to the tray 5 in phases I and/or II in order to minimise the bulging in phase II.

In phase III the new layer $3_{i+1}$ is cured as described by activation of the light source 10.

As the construction platform 11 is raised with the adhered substance layer stack $3_1$-$3_i$ in phase IV, the tray base 6 stretches upwardly on account of the resilience of the material of the tray 5, whereas the newly cured layer $3_{i+1}$ detaches or peels off progressively from the tray base 6 from the sides. This reduces the force necessary to raise the construction platform 11 and enables a gentle, destruction-free demoulding of the new substance layer $3_{i+1}$. On account of the resilience of the entire tray 5, the edge 7 of the tray 5 may also deform in phase IV, which promotes or at least does not hinder the deformation of the tray base 6.

In phase IV additional diametrical compression $F_2$ can be exerted onto the tray 5 in order to promote the bulging of the tray base 6 upwardly, such that the increasingly convex shape thereof promotes the peel-off process of the layer $3_i$. Alternatively (not shown), such a diametrical compression $F_2$ could also cause the tray base 6 to bulge downwardly in order to reinforce the demoulding force.

The control of the motor 12 for raising the construction platform 11 is optionally synchronised by the electronics unit 13 with the control of the tensioning means 9 for exerting compression $F_2$ so as to achieve precisely that extent of curvature of the tray base 6 that assists and promotes the aforementioned peel-off effect of the layer $3_{i+1}$.

Alternatively, instead of diametrical compression $F_2$, diametrical tension $F_3$ could be exerted onto the tray 5 in phase IV in order to promote the peeling off of the tray base 6 from the layer $3_i$. FIG. 5 shows a development of such an embodiment with a phase IV, in which strong diametrical tension $F_3$ is exerted already at the start. On account of the exertion of tension $F_3$ onto the tray base 3, this stretches and sustains a reduction of thickness, which likewise promotes a progressive detachment or peeling off of the tray base 6 from the layer $3_{i+1}$ starting from the sides. This exertion of tension can also be synchronised with the lifting movement of the construction platform 11, in order to attain the greatest possible effect. In a simplified further variant of the system 1, the tensioning means 9 could be completely omitted, i.e. there could be no additional tensile or compressive forces $F_1$, $F_2$, $F_3$ applied to the tray 5, such that the tray 5 resiliently deforms primarily exclusively by the immersion forces in phase II and peel-off forces in phase IV.

It goes without saying that the tensile and compressive forces $F_1$, $F_2$, $F_3$ applied to the tray 5 do not have to be applied exactly antiparallel to diametrically opposed sides of the tray, but may also be placed offset and/or slightly inclined to one another, if desired.

A further option is to apply the tensile and compressive forces $F_1$, $F_2$, $F_3$ in each case in a to pulsating manner, for example for a limited period of time, and/or repeatedly in alternation to the tray 5, more specifically in each of the specified phases II and IV. The tray 5 may thus be made to vibrate for example by the tensioning means 9. In general terms, the tensioning means 9 may bring the tray 5 at any moment in time or during any sub-step of the process into a physical stress state changeable over time, optionally a two-dimensional stress state changeable over time.

Figure 6:
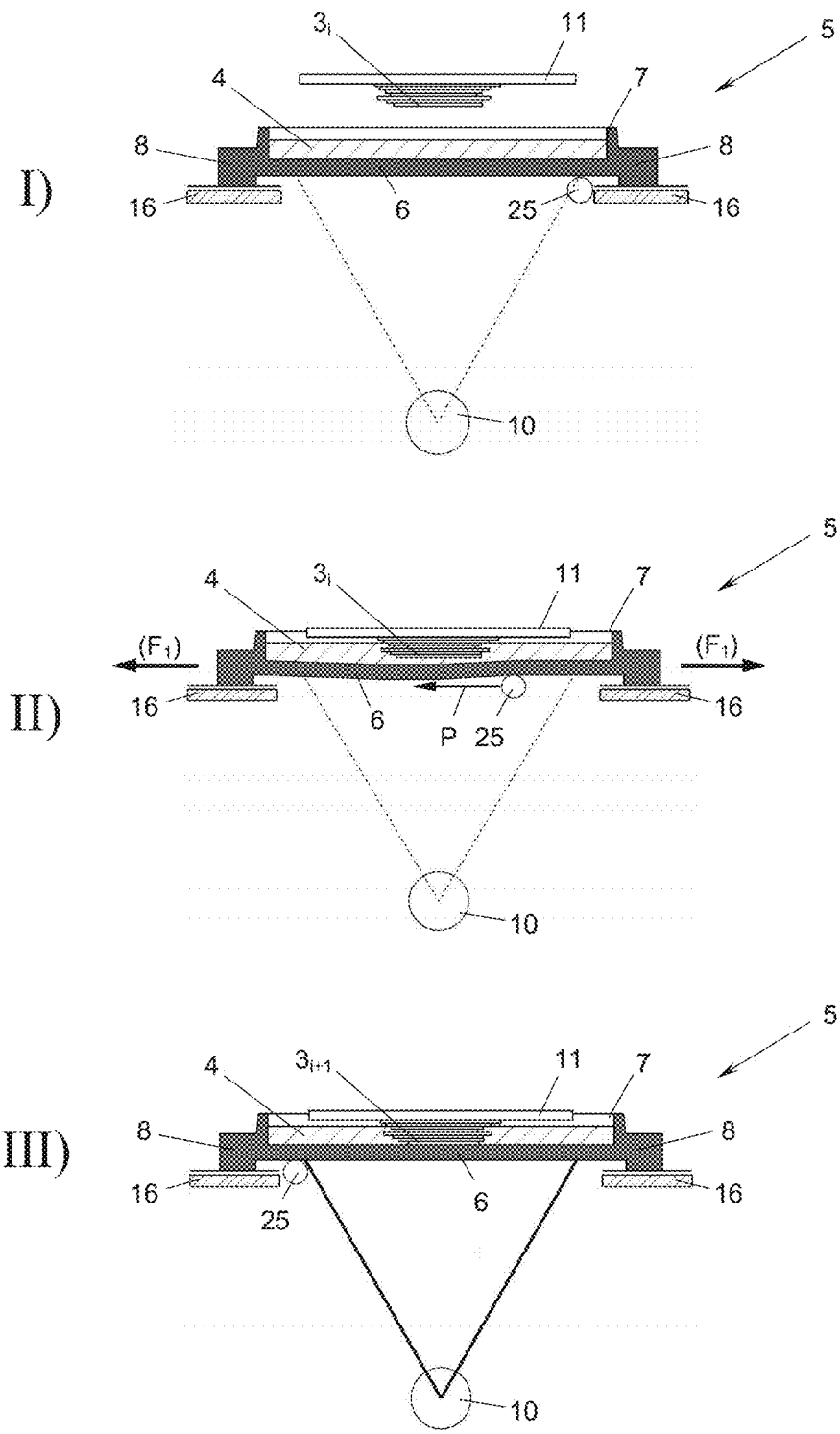

FIG. 6 shows an additional measure for returning a downwardly bulged tray base 6 in phase II in order to achieve a planar configuration of the tray base 6 for the exposure processing phase III. In this embodiment of the system 1 a flattening element 25 is mounted movably in a substantially horizontal plane below the tray base 6 in abutment against the underside thereof. The flattening element 25 by way of example is a straight edge or a doctor blade, which extends over the entire width B of the tray base 6 and can be moved back and forth over the entire length L of the tray base 6 in the direction of the arrow P. The flattening element 25 can be a rotatable roller, which can roll over the underside of the tray base 6. The flattening element 25 by way of example can be guided on the linear guides 17 of the tensioning means 9 and can be driven by a drive (not illustrated), which is controlled by the control electronics 13.

In phase II or before phase III the flattening element 25 moves (at least) once over the underside of the tray base 6 in order to flatten this and to bring it into a planar position for the exposure phase III, in which the tray base 6 lies at a defined distance from the last-cured substance layer $3_i$.

Figure 7A:
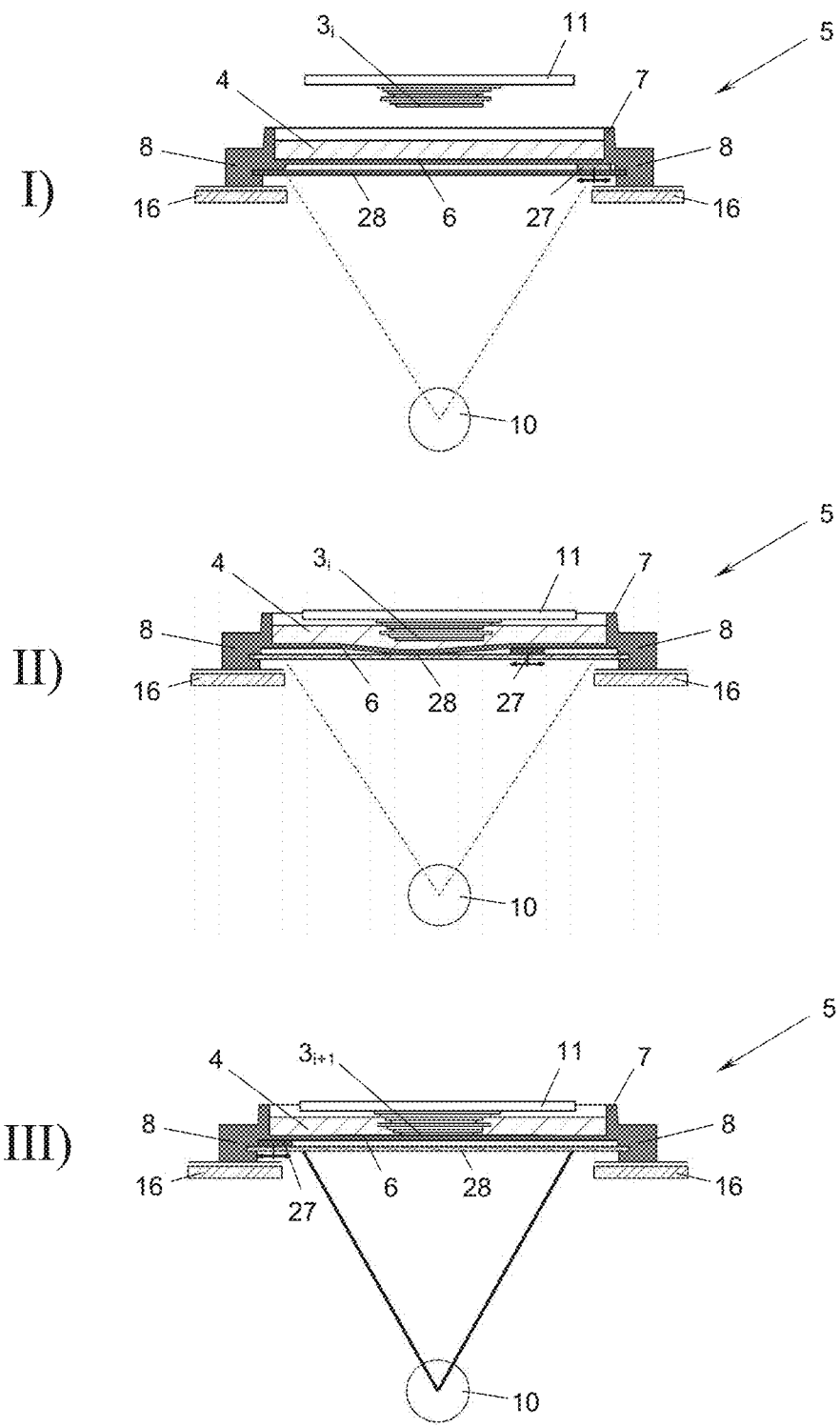

FIGS. 7a and 7b show a special embodiment of a flattening element 27, which—instead of or in addition to a support on the linear guides 17—is supported on a transparent sliding plate 28, which extends below the tray base 6. The flattening element 27 could alternatively also be guided in the gap 24 between the upper base 22 and lower base 23 of a double base 6 according to FIG. 3b.

Figure 8A:
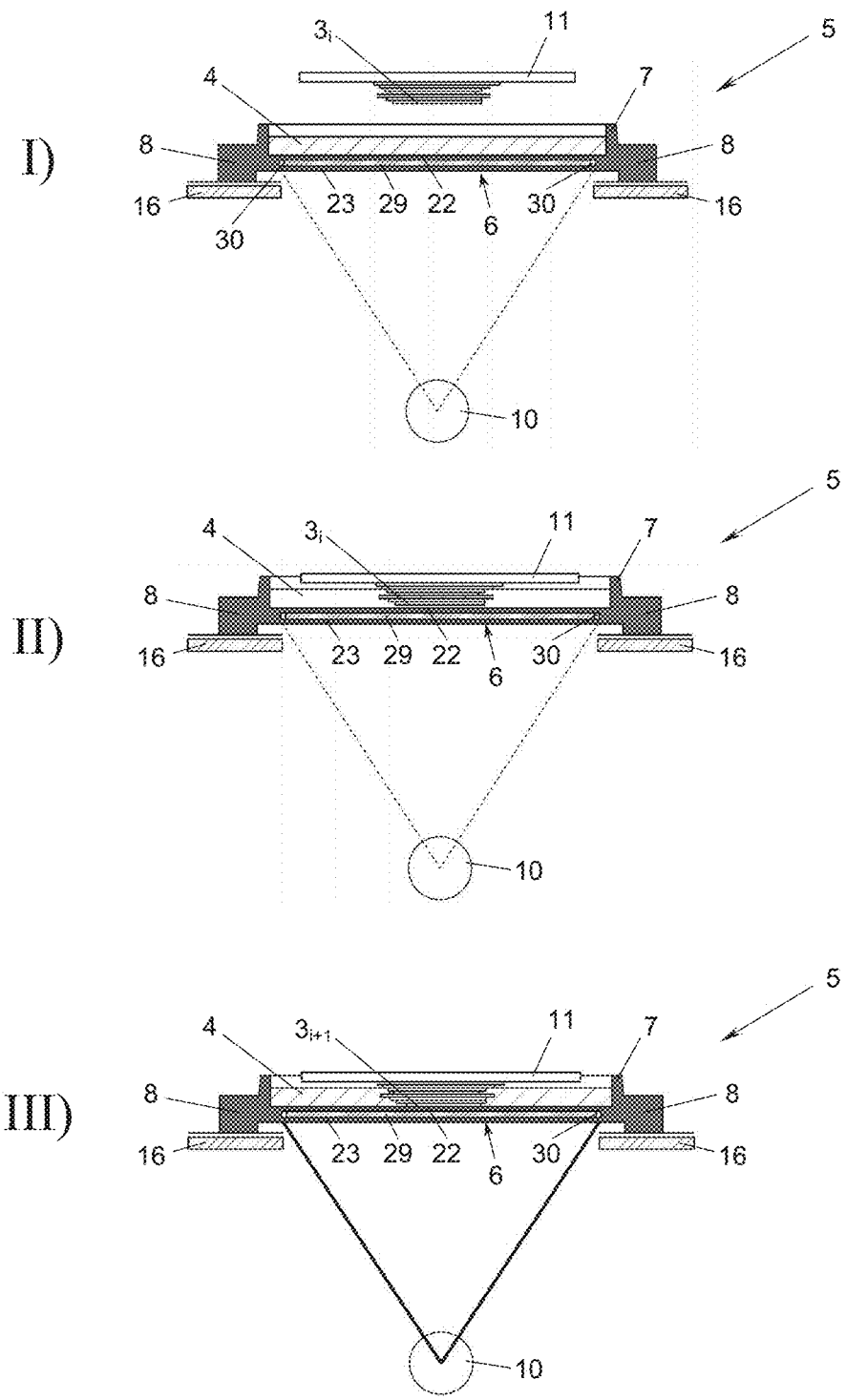

FIGS. 8a and 8b show a further possible application of a double base 6 of the tray 5. In the gap 24 there is arranged a rigid plate 29, which can slide relative to the bases 22, 23 of the double base 6 and—at least in the stretched state of the tray 5—also has lateral play 30 between the edges of the play 29 and the side walls of the gap 24. The plate 29 may be embedded in the material of the tray 5 for example during production of the tray 5 by injection moulding. An anti-adhesion or sliding coating of the plate 9 may prevent a fixed connection of the plate 29 to the bases 22, 23, such that the plate 29 can slide in the double base 6 in the event of stretching or compression of the tray 5

The plate 29 prevents the downward bulging of the base 6 in phase II and does not impair the resilient peeling off of the upper base 22 in phase IV or the return thereof into the final and starting positions V and I respectively.

CONCLUSION

The present application is not limited to be presented embodiments, but includes all variants, modifications and combinations of the aforementioned features that fall within the scope of the accompanying claims.

What is claimed is:

1. A system for layered construction of a body made of a light-curable substance, comprising:
   a tray made of resilient material for receiving the substance in a liquid or pasty state;
   a light source configured for regionally selective curing of a layer of the substance lying on a base of the tray;
   a construction platform arranged above the base of the tray and capable of being lowered and raised relative thereto for adhering to and lifting a cured substance layer;
   a tensioning means, which is configured to exert tension or compression onto the tray; and
   a control means configured to control the tensioning means and the construction platform, wherein the tensioning means is configured to exert substantially diametrical tension or compression onto the tray.

2. The system according to claim 1, wherein at least the base of the tray is at least partially light-permeable.

3. The system according to claim 1, wherein the tray is produced in one piece from the resilient material.

4. The system according to claim 1, further comprising a flattening element, which is mounted movably in a plane below the base of the tray in abutment against an underside of the base of the tray in order to flatten the base of the tray.

5. The system according to claim 4, wherein the flattening element is a roller, which rolls over the underside of the base of the tray.

6. The system according to claim 1, wherein the base of the tray is a double base comprising an upper base and a lower base.

7. The system according to claim 6, wherein a flattening element, which is movable over an underside of the upper base in order to flatten the upper base, is mounted between the upper base and the lower base of the double base.

8. The system according to claim 6, wherein a rigid plate, which can slide relative to the upper base and the lower base in the event of resilient deformation of the tray, is arranged between the upper base and the lower base of the double base.

* * * * *